Patented Nov. 29, 1932

1,889,157

UNITED STATES PATENT OFFICE

JULIUS SÖLL, OF FRANKFORT-ON-THE-MAIN-SCHWANHEIM, AND CURT RUNKEL, OF SANDERSDORF, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF CHLORINATING HYDROCARBONS

Application filed October 18, 1929, Serial No. 400,655, and in Germany December 11, 1922.

This invention relates to the chlorination of hydrocarbons and their chloroderivatives and is more especially concerned with a chlorinating process in which the chlorination is facilitated by employing contact substances, such as activated carbon or other catalysts such as metal salts deposited on a suitable carrier, or substances acting by their surface properties such as glass, pumice and the like, or by bringing actinic rays to bear on the reaction mixtures.

When chlorinating hydrocarbons in this manner it is already known to carry out the reaction in such a manner that a considerable excess of the chlorinating gas or a quantity of inert gases is admixed to avoid secondary reactions which might take place owing to overheating. The hydrocarbon gas, for instance, methane, is in this case preferably conducted in a circular current passed from the reaction chamber which is filled with a suitable catalyst or provided with a device for producing actinic rays through a condenser and a fan and back to the reaction chamber. If the chlorination is combined with the production of hydrochloric acid, a condenser charged with water is usually placed in the circular current. This method of removing the hydrochloric acid, however, entails the considerable drawback that the circulating gas is moistened so that the apparatus must be made of earthen-ware which makes it very expensive. Moreover the water in some cases acts to hydrolyze the products of chlorination.

Now we have found it also possible to allow the hydrochloric gas to accumulate in the circulating gas current, as long as a certain concentration is not exceeded. The hydrochloric acid gas, in this case, assumes the character of a diluent for the gases to be chlorinated and replaces, wholly or partly, the excess of chlorinating gas otherwise used or the diluent inert gas. This inert gas may in certain cases be purposely added to the gaseous mixture to be chlorinated. It should be noted however that the hydrocarbon gases usually employed as raw materials as well as the chlorine always contain definite although small amounts of inert gases, such as N, $CO_2$ as impurities, which evidently also accumulate in the circular current in course of time.

So as to avoid an excessive concentration of the hydrochloric acid, a measured quantity of the circulating gas is preferably withdrawn at a suitable point of the circulating current, for instance, on the pressure side of the fan, and the hydrochloric contents are separated therefrom, preferably by condensation. The remaining gas thus conducted in a secondary circuit is then reunited with the main circular current.

By varying the quantity of the gas conducted in the secondary circuit it is possible to establish a predetermined hydrochloric acid concentration in the gas to be re-entered into the reaction chamber. So as to avoid a too high concentration of the inert gases present it is further advisable to branch off and discard a certain quantity of the inert gases conducted in the secondary circuit after condensation of the hydrochloric acid. Of course it is equally possible, in case of emergency, to discard the entire quantity of gases conducted in the secondary branch after having condensed the hydrochloric acid contained therein.

In this manner, it is possible to control the concentration of hydrochloric acid and of inert gas, respectively, in the gas mixture which is reintroduced into the reaction chamber, independently of each other.

It is understood that by accumulating the hydrochloric acid the gas to be chlorinated becomes more diluted than hitherto usual. However, when working in such a way that the gases are passed through a furnace filled with the contact mass and heated to the required temperature before starting the reaction, the furnace is gradually blown cold. A cold zone begins to form at the point where the gases enter which gradually extends throughout the apparatus so that it finally ceases to work. This phenomenon even takes place when the reaction heat per se would suffice to bring the gases up to the desired temperature, for the reason that the gases do not react immediately after having entered the reaction chamber, but only during their passage through the chamber. Of course the situation is still more unfavorable when the dilution is increased so far that the reaction heat is insufficient to effect the necessary heating of the gases any longer.

If it be attempted to supply heat from without through the apparatus walls to avoid this inconvenience, overheating near the wall and thereby decomposition takes place when working on an industrial scale so that one is obliged to preheat the gases to a suitable temperature before they enter the reaction chamber. This preheating might be effected in the well known manner by means of heat exchangers utilizing the heat of the escaping gases, or also by applying preheaters fed by steam or other means. However, as iron ceases to be resistant towards chlorine at moderately elevated temperatures, the preheating devices must be made of lead which is expensive and little durable. Moreover the low heat conductivity of lead is unfavorable. As lead softens at 150° C. it is useless at temperatures above that limit. The wear of appliances of chamotte is even greater than that of lead.

Now we have further ascertained that the required preheating can be effected in a simple way by employing heat generators. For this purpose we may employ well insulated containers lined with refractory material and filled with a material such as chamotte, quartz, pumice or the contact mass itself and inserted before or behind the reaction chamber. The chlorine and the gas to be chlorinated may be admixed to the circular current before it enters the regenerator, or between the latter and the reaction chamber. In the first case part of the reaction already takes place in the regenerator. If it is desired to maintain the temperature in the reaction chamber at a constant level, which is important for many chlorinating processes, such a quantity of cold gas is added to the preheated gas-mixture by means of a short circuit supply pipe, that the temperature of the reaction chamber remains constant.

An especially convenient method of operating consists in employing one or more serially connected reaction chambers and reversing, from time to time, the direction of the gas current by actuating a suitable valve system. If the reversal is effected in the proper intervals, the reaction, after each reversal of the gas current, starts at once at the point of entrance of the gas preheated by the escaped gases in the same manner as in the freshly heated device. While this point and the adjacent section of the tube is cooled down by the fresh gas blown in, the other side of the furnace in turn becomes heated by the escaping gas. Therefore after each reversal of the gas current the play begins anew. In this way the entire reaction heat is utilized, except for that part which is lost by radiation through the walls or which is led off with the waste gases, and chlorination thus may be effected without external heating, even if the chlorine content of the gas current is extremely low. Of course, when the chlorine concentration employed is so low that the reaction heat is insufficient to maintain the reaction temperature throughout the apparatus a suitable preheating device may be placed in the gas current before it enters the reaction chamber.

According to the present invention chlorinated products may be obtained from chlorine and gases containing methane with nearly theoretical output provided secondary reactions are avoided by correspondingly regulating the speed of the circulating gas and the chlorine concentration.

Of course, it is possible to introduce hydrochloric acid from a foreign source when starting the apparatus, or even to continue doing so afterwards without departing from the spirit of our invention. In the same manner the hydrochloric acid gas resulting in the course of the process might be temporarily stored for utilization in a later stage of the process. However, no advantages are to be derived from this procedure, as the desirable hydrochloric acid concentration is, in the present process, automatically attained in any case within a short time without special measures.

The advantages of the present invention over what is known may be summarized as follows:—

1.—In the chlorinating device proper only gas mixtures are present which are inexplosive in contact with air, thus increasing the safety of working.

2.—The reaction products cannot accumulate in the gas mixture to be chlorinated so that no secondary reactions impairing the yield can take place.

3.—The chlorination according to the present invention can be effected in a single or in a limited number of furnaces, thus facilitating superintendence.

4.—Owing to the stronger dilution with inert foreign gases, higher temperatures can be employed than with the old processes. Thus, the increased reaction velocities corresponding to more elevated temperatures may be utilized without decomposing the reaction products so that in spite of the lower concentration of the reacting gases a higher production per unit of time is attained.

In the accompanying drawing two different modes of carrying out our present invention are diagrammatically illustrated by way of example.

Figure 1:
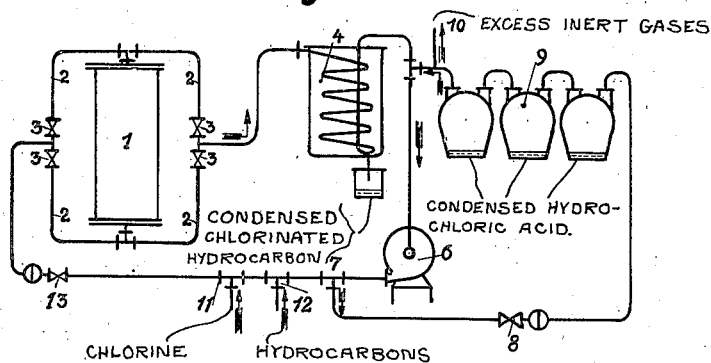
Figure 1 is a showing of the general mode of circulation employed.

In Figure 1, 1 is a reaction chamber filled, for instance, with pumice stone and heated, before starting the operation, to a suitable temperature. The opposite ends of said chamber are connected with a system of pipes 2 provided with valves 3 whose operation enables the direction of the gas current through 1 to be changed in measured intervals, say, every half hour. The gases leaving the reaction chamber are then passed into the condenser 4 for separating the chlorinated hydrocarbons and hence through T-piece 5 on to fan 6. T-piece 7 serves to branch off part of the circulating gases to the hydrochloric acid condensation 9; the extent of this part is regulated by valve and baffle rim 8. From the condensation, the remaining inert gases are returned into the main circulation path by T-piece 5. An undesirable excess of these inert gases, however, may be led off into the open by an outlet 10 provided with a water seal. 11 and 12 are T-pieces provided with valves serving to supply measured quantities of fresh chlorine and hydrocarbon respectively. The mixture of fresh and circulated gases is then passed on through a pipe provided with a valve and baffle rim 13 serving to regulate the main gas circuit into the system of pipes leading into the reaction chamber.

It will be seen that the composition of the gas introduced in the reaction chamber may be exactly controlled, as to its contents in hydrocarbon, chlorine, hydrochloric acid and inert gases by means of valves 11, 12, 8 and 13.

In this apparatus, embracing, for instance, a reaction chamber having a volume of 100 litres and filled with pumice, when preheated to 400° C., about 15 cubic meters of gas per hour are circulated. When introducing 180 litres of methane and 750 litres of chlorine per hour, and cooling the condenser with water of room temperature, carbon tetrachloride containing only traces of chloroform is formed almost exclusively and the yield amounts to almost 100 per cent (taking into account the quantity escaping through 10), provided that, by adjusting the chlorine concentration, the temperature in the reaction chamber was kept at or below 450° C. The hydrochloric acid contents in the circulating gas was fixed at 50%. This fixation however was purely arbitrary, as any other ratio answers equally well when producing carbon tetrachloride. Besides methane, the gas still contained foreign gases and chlorination products of methane which were not separated by the condenser.

When introducing 240 litres of methane and 750 litres of chlorine into the apparatus, a mixture of about equal parts of chloroform and carbon tetrachloride, besides traces of methylene chloride was obtained; with 350 litres of methane and 750 litres of chlorine and employing a cooling liquid with a temperature of less than zero, we received a high percentage of methylene chloride, and by inserting an absorbing device for methyl chloride instead of a cooler and introducing still more methane, methyl chloride was produced almost exclusively.

When it is desired to further chlorinate lower methane chlorination products so as to obtain, say, carbon tetrachloride, in the above-described apparatus, a tower irrigated with the compound to be chlorinated may be placed in the circulating gas current in which tower the compound to be chlorinated is vaporized and admixed to the gas current. Further methane may or may not be introduced simultaneously.

In the same manner other liquid hydrocarbons may be chlorinated after vaporization. As circulating gas, initially a foreign gas is employed which is in the course of the process gradually replaced by hydrochloric acid or by the foreign gases admixed to the chlorine.

Figure 2:
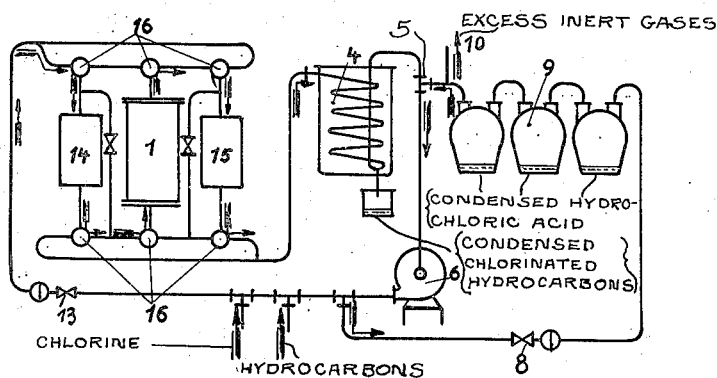
Figures 2 and 3 are showings of the mode of circulation in combination with the preheating of the reaction gases by means of heat regenerators and represent, respectively, the two opposed paths alternately followed by the gases.
Figure 3:
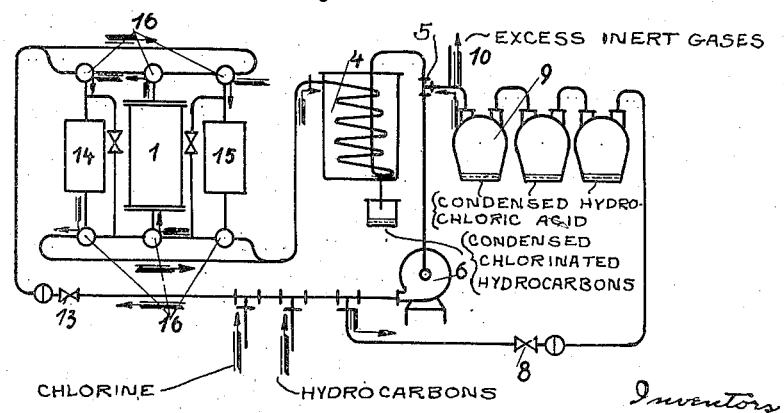

When employing heat recovery the apparatus is modified as shown in Figure 2 and 3, in which, respectively, the path of the gases through the heat regenerators 14 and 15 and the reaction chamber 1 in the two opposite directions is controlled by suitably adjusting the three way valves 16.

In Figure 2, the gas coming from valve and baffle rim 13 is conducted through regenerator 14, hence into the reaction chamber 1 whence it enters the regenerator 15 imparting its sensible heat to the latter. In Figure 3, the gas mixture passes through the system in the opposite direction, i. e. is first preheated by passing through 15, then enters the reaction chamber and issues into the pipe line leading to condensation 4 via regenerator 14 which thus becomes heated in turn.

When carrying out the reactions by means of actinic rays, a glass bottle of, say, 10 litres may be substituted for the reaction chamber indicated in the drawing, which bottle may be heated, if required, in a water-bath. The bottom of this bottle is covered with a layer of activated carbon, and a nitra or quartz lamp having a power of, say, 1000 candles is arranged in the bottle. Then 1/50 of the above mentioned quantities of gas is circulated or introduced respectively.

We claim:—

1. In a process of producing chlorinated hydrocarbons which comprises causing chlorine to react with hydrocarbon compounds in a reaction chamber, separating the chlorinated hydrocarbons formed from the gas issuing from the reaction chamber, mixing the remaining gas with fresh reaction gases and reintroducing said gaseous mixture into the reaction chamber, the step which consists in re-introducing the hydrochloric acid formed in the reaction and still contained in the remaining gases along with said gaseous mixture into the reaction chamber.

2. In a process as defined in claim 1, the step which consists in admixing with the fresh reaction gases a portion of the remaining gas adjusted so as to maintain a concentration of hydrochloric acid in the resulting gaseous mixture which is below that at which further chlorination of the said mixture will be prevented.

3. In a process as defined in claim 1, the steps which consist in separating the chlorinated hydrocarbons from the gas issuing from the reaction chamber, subjecting such a portion of the gas remaining after the separation of chlorinated hydrocarbons to hydrochloric acid condensation as will avoid prevention of further chlorination due to the building up of an exceedingly high concentration of inert gas in the circulating gases, re-uniting part of the gas remaining after said hydrochloric acid condensation with the portion of the gas from the reaction chamber still containing hydrochloric acid, mixing said re-united gas with fresh reaction gases, and re-introducing said mixture, into the reaction chamber.

4. In a process as defined in claim 1, the steps which consist in separating the chlorinated hydrocarbons from the gas issuing from the reaction chamber, mixing such a portion of the gas thus obtained and still containing hydrochloric acid with fresh reaction gases as will maintain a hydrochloric acid concentration in the resulting gas mixture below that at which further chlorination of the said mixture will be prevented, and re-introducing said mixture into the reaction chamber.

5. In a process as defined in claim 1, the steps which consist in separating the chlorinated hydrocarbons from the gas issuing from the reaction chamber, subjecting such a portion of the gas remaining after the separation of chlorinated hydrocarbons to hydrochloric acid condensation as will avoid prevention of further chlorination due to the building up of an exceedingly high concentration of inert gas in the circulating gases, re-uniting part of the gas remaining after said hydrochloric acid condensation with the portion of the gas from the reaction chamber still containing hydrochloric acid, mixing said re-united gas with fresh reaction gases, pre-heating said mixture and re-introducing said pre-heated mixture into the reaction chamber.

6. In a process as defined in claim 1, the steps which consist in separating the chlorinated hydrocarbons from the gas issuing from the reaction chamber, mixing such a portion of the gas thus obtained and still containing hydrochloric acid with fresh reaction gases as will maintain a hydrochloric acid concentration in the resulting gas mixture below that at which further chlorination of the said mixture will be prevented, pre-heating said mixture and re-introducing said pre-heated mixture into the reaction chamber.

7. In a process as defined in claim 1, the steps which consist in separating the chlorinated hydrocarbons from the gas issuing from the reaction chamber, subjecting such a portion of the gas remaining after the separation of chlorinated hydrocarbons to hydrochloric acid condensation as will avoid prevention of further chlorination due to the building up of an exceedingly high concentration of inert gas in the circulating gases, re-uniting part of the gas remaining after said hydrochloric acid condensation with the portion of the gas from the reaction chamber still containing hydrochloric acid, mixing said re-united gas with fresh reaction gases and reversing the direction of the gas current in the reaction chamber at measured intervals, so as to maintain the reaction temperature in the reaction chamber.

8. In a process as defined in claim 1, the steps which consist in separating the chlorinated hydrocarbons from the gas issuing from the reaction chamber, mixing such a portion of the gas thus obtained and still containing hydrochloric acid with fresh reaction gases as will maintain a hydrochloric acid concentration in the resulting gas mixture below that at which further chlorination of the said mixture will be prevented and reversing the direction of the gas current in the reaction chamber at measured intervals, so as to maintain the reaction temperature in the reaction chamber.

9. In a process as defined in claim 1, the steps which consists in separating the chlorinated hydrocarbons from the gas issuing from the reaction chamber, subjecting such a portion of the gas remaining after the separation of chlorinated hydrocarbons to hydrochloric acid condensation as will avoid prevention of further chlorination due to the building up of an exceedingly high concentration of inert gas in the circulating gases, re-uniting part of the gas remaining after said hydrochloric acid condensation with the portion of the gas from the reaction chamber still containing hydrochloric acid, mixing said re-united gas with fresh reaction gases, contacting said mixture with means for imparting sensible heat and re-introducing said mixture in the reaction chamber, so as to maintain the reaction temperature in the reaction chamber.

10. In a process as defined in claim 1, the steps which consist in separating the chlorinated hydrocarbons from the gas issuing from the reaction chamber, mixing such a portion of the gas thus obtained and still containing hydrochloric acid with fresh reaction gases as will maintain a hydrochloric acid concentration in the resulting gas mixture below that at which further chlorination of the said mixture will be prevented, contacting said mixture with means for imparting sensible heat and re-introducing said mixture in the reaction chamber, so as to maintain the reaction temperature in the reaction chamber.

In testimony whereof, we affix our signatures.

JULIUS SÖLL.
CURT RUNKEL.